United States Patent [19]
Kaul et al.

[11] Patent Number: 5,316,553
[45] Date of Patent: May 31, 1994

[54] DYESTUFFS FOR THE DYEING OF SYNTHETIC POLYAMIDES

[75] Inventors: Bansi L. Kaul, Biel-Benken, Switzerland; Angelos-Elie Vougioukas, St. Louis, France

[73] Assignee: Sandoz Ltd., Basle, Switzerland

[21] Appl. No.: 736,149

[22] Filed: Jul. 26, 1991

Related U.S. Application Data

[62] Division of Ser. No. 374,511, Jun. 30, 1989, Pat. No. 5,037,448.

[30] Foreign Application Priority Data

Jun. 30, 1988 [DE] Fed. Rep. of Germany ....... 3821981

[51] Int. Cl.$^5$ ..................... C09B 69/02; C08G 69/48; D06P 1/39; D06P 3/24
[52] U.S. Cl. .......................................... 8/639; 8/641; 8/643; 8/675; 8/685; 8/686; 8/924; 8/928; 8/938; 534/692; 534/697; 534/701; 546/184; 546/186; 546/244; 546/245; 546/246
[58] Field of Search .................... 8/638, 639, 641, 685, 8/686, 639, 643, 685, 686; 534/692, 697, 702; 546/186, 244

[56] References Cited

U.S. PATENT DOCUMENTS

| | | | |
|---|---|---|---|
| 3,346,322 | 10/1967 | Finkenauer et al. | 8/527 |
| 3,467,482 | 9/1969 | Maerov | 8/512 |
| 3,681,319 | 8/1972 | Lindberg | 534/664 |
| 3,945,837 | 3/1976 | Miyata et al. | 106/22 |
| 4,028,334 | 6/1977 | Chalmers et al. | 524/100 |
| 4,102,639 | 7/1978 | Zenhauser et al. | 8/547 |
| 4,115,379 | 9/1978 | Perrey et al. | 8/524 |
| 4,263,197 | 4/1981 | Lienhard et al. | 8/516 |
| 4,668,774 | 5/1987 | Loeffler et al. | 534/728 |
| 4,767,421 | 8/1988 | van der Veen et al. | 8/523 |
| 4,866,113 | 9/1989 | Bitterli et al. | 106/493 |
| 4,877,412 | 10/1989 | Pedrazzi | 8/437 |
| 4,992,495 | 2/1991 | Hari et al. | 524/106 |
| 5,037,448 | 8/1991 | Kaul | 8/539 |

FOREIGN PATENT DOCUMENTS

| | | |
|---|---|---|
| 746427 | 8/1970 | Belgium . |
| 331 | 12/1983 | European Pat. Off. . |
| 253007 | 1/1988 | European Pat. Off. . |
| 1195887 | 4/1967 | Fed. Rep. of Germany . |
| 3434920 | 5/1986 | Fed. Rep. of Germany . |
| 1506870 | 12/1966 | France . |
| 2032391 | 11/1970 | France . |
| 2091187 | 12/1971 | France . |
| 2193068 | 2/1974 | France . |
| 86/01815 | 3/1986 | PCT Int'l Appl. . |
| 814605 | 6/1959 | United Kingdom . |
| 814695 | 6/1959 | United Kingdom . |
| 882837 | 11/1961 | United Kingdom . |
| 944409 | 12/1963 | United Kingdom . |
| 981050 | 1/1965 | United Kingdom . |
| 1480712 | 7/1977 | United Kingdom . |
| 215673 | 10/1985 | United Kingdom . |
| 2184743 | 7/1987 | United Kingdom . |

*Primary Examiner*—A. Lionel Clingman
*Attorney, Agent, or Firm*—Robert S. Honor; Melvyn M. Kassenoff

[57] ABSTRACT

Salts of ionic dyes with compounds which contain at least one ammonium, cycloammonium or immonium group and at least one aliphatic, cycloaliphatic or carbonyl radical-substituted aromatic group or containing a piperazine or piperidine group or a heteroaromatic group selected from those of the triazine, pyrimidine, quinazoline, quinoxaline, phthalazine or phthalimidine series or which contain at least two carboxylic acid groups, at least one amino group and at least one carboxylic acid group or at least one sulfonic acid group and one aliphatic, cycloaliphatic, monocyclic aromatic or heteroaromatic group are useful for dyeing synthetic materials, particularly synthetic polyamides in the mass. The obtained dyeings have exceptionally good wet fastness.

15 Claims, No Drawings

DYESTUFFS FOR THE DYEING OF SYNTHETIC POLYAMIDES

This is a division of application Ser. No. 07/374,511, filed Jun. 30, 1989, now U.S. Pat. No. 5,037,448 issued Aug. 6, 1991.

The present invention relates to dyestuffs having improved wet-fastness for use with synthetic materials such as synthetic polyamides.

It has been shown that fiber material consisting of synthetic polyamides which has been mass-dyed with anionic dyestuffs has poor wet-fastness, especially poor washing fastness. The dyestuffs bleed into the washing liquor disproportionately, which has led to strong protests from consumers.

A class of dyestuffs has now been found which are eminently suitable for the mass-dyeing of synthetic polyamides, especially those which are processed into fiber material. The obtained dyeings have considerably improved wet-fastness.

Accordingly, the present invention provides salts of the formula $$F\cdot(A)_n \qquad (I),$$

and mixtures of such salts, wherein

F is the radical of an anionic or cationic dyestuff; and

A, when F is the radical of an anionic dyestuff, is a group containing at least one ammonium, cycloammonium or immonium group and at least one aliphatic, cycloaliphatic or carbonyl-substituted aromatic group, or A is a group containing a piperazine or piperidine group or a heteroaromatic group selected from those of the triazine, pyrimidine, quinazoline, quinoxaline, phthalazine and phthalimidine series, with the proviso that when the group A contains at least one aliphatic or cycloaliphatic group but no aromatic or heteroaromatic group, it also contains at least one cycloammonium group; or A, when F is the radical of a cationic dyestuff, is a group containing at least two carboxylic acid groups (e.g., a $C_{2-14}$ aliphatic dicarboxylic acid) or at least one amino group and at least one carboxylic acid group (e.g., an amino-$C_{2-12}$ alkyl-carboxylic acid) or at least one sulfonic acid group together with one aliphatic, cycloaliphatic, monocyclic aromatic or heteroaromatic group; and n is 1, 2, 3 or 4.

The compounds of formula I are novel.

In this specification, the term "carbonyl" (of the carbonyl-substituted aromatic groups) means a —CO— radical, the term "ammonium" means an

group no two valences of which are linked together to form a heterocyclic ring together with the nitrogen atom, the term "cycloammonium" means an

group two or more valences of which are linked together to form a heterocyclic ring together with the nitrogen atom, and the term "cationic dyes" embraces dyes having a free amino group that is protonated upon reaction with A.

Suitably, radicals F are of anionic dyestuffs, such as those of the azo, anthraquinone, phthalocyanine and dioxazine series, preferably of metallized azo-dyes free from sulfonic acid groups, particularly the chromium complex dyes. Preferred radicals F of cationic dyestuffs are, for example, those of the azo and triphenylmethane dyes.

Preferably A, when F is the radical of an anionic dyestuff, is a group containing one or two ammonium groups and a $C_{1-12}$ alkyl, cyclohexyl, piperazine, triazine, pyrimidine, quinazoline, quinoxaline, phthalazine, phthalimide, phenyl or fused benzene group, most preferably containing a phenyl, fused benzene or 1,3,5-triazine group.

When F is the radical of an anionic dye, A preferably contains a cycloammonium group, most preferably a 2,2,6,6-tetramethylpiperidinium group or a piperazinium group, the piperazinium group linked by the cycloammonium nitrogen atom.

Preferably, n is 1 or 2; most preferably, n is 1.

Preferably, the radical A contains a group selected from:

(a) a phenyl or fused benzene group which is substituted by one to four groups of the formula

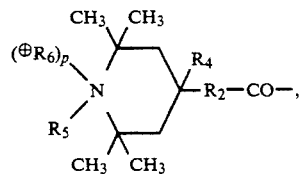

wherein
when p is 0, c is a group $R_{1a}$, and
when p is 1, c is a group $R_{1b}$;
wherein
$R_2$ is —O— or —$NR_3$—, and each $R_3$, $R_4$, $R_5$ and $R_6$ is independently hydrogen or $C_{1-2}$alkyl, with the proviso that when c is a group $R_{1a}$, there is a cationic group elsewhere in the molecule;

(b) a triazine group which is substituted at the 2- and 4-positions by a group of formula $R_{1a}$ and a group of formula $R_{1b}$ and at the 6-position by chlorine or, where appropriate, a group of formula $R_{1a}$; and (c) a triazine group which is substituted at each of the 2- and 4-positions independently by a group of the formula $$-NH-(CH_2)_{2-4}-N^{\oplus}H(R_7)_2,$$

wherein each $R_7$ is independently C 1-4 alkyl, and preferably $C_{1-2}$ alkyl, the two $R_7$ groups more preferably being identical, and at the 6-position by chlorine.

Most preferably, when A contains a benzene group, the benzene group is substituted by one, two or three substituents of formula $R_{1a}$ (i.e. the free amine form) and one or two substituents of formula $R_{1b}$ (i.e. the basic ammonium form).

Preferably A, when the radical F is cationic, contains an aromatic or heteroaromatic bridging group linking from one to four carboxylic acid or sulfonic acid group-containing side chains or it is a $C_{2-14}$-dicarboxylic acid or an amino-$C_{2-12}$ carboxylic acid.

Preferably an acid side chain has the structure -X-Y-Z, wherein X is —NH— or —CONH—, Y is $C_{1-14}$ alkylene or phenylene, and Z is —$CO_2H$ or —$SO_3H$.

In this specification, any group which is capable of being linear or branched may be linear or branched, e.g., alkyl groups and alkylene radicals may be linear or branched.

The salts of the present invention may be used for mass-dyeing of plastics such as, for example, synthetic polyamides of all classes, conveniently synthetic polyamides which are processed into fiber material.

The dyeings obtained with these salts are very colorfast and brilliant and have considerably better wet fastness, especially washing fastness, than the corresponding dyestuff F not bound to a group A.

Suitable dyestuffs which form radicals F of the present invention and react to give salts of the invention are, for example, dyestuffs given in Colour Index, Third Edition, 1971 and supplements (see also Colour Index International 1987) under "Acid Dyes" and "Direct Dyes", "Solvent Dyes" containing acid or basic groups and those given as "Basic Dyes" as well as more recently developed dyes with similar properties. These are generally of better solubility in the commonly used solvents than the common solvent dyes. In ethanol, for example, most will reach solubilities of up to 400 g/liter.

Preferably A is derived from one of the following Components A (shown in the free amino or cyclic amino form):

1. 1,3,5-tri-(2',2',6', 6'-tetramethylpiperidyl-4'-)-trimesic acid triamide
2. 2,4-bis-(2',2',6',6'-tetramethylpiperidyl-4'-amino)-6-chloro-triazine
3. 2,4,6-tri-(2',2',6',6'-tetramethylpiperidyl-4-amino)triazine
4. bis-(2',2',6',6'-tetramethylpiperidyl-4'-aminocarbonyl-paraphenylene)-terephthalic acid diamide
5. bis-(2',2',6',6'-tetramethylpiperidyl-4'-)-terephthalic acid diamide
6. 2,4-bis-(2',2',6',6'-tetramethylpiperidyl-4'-amino)-quinazoline
7. 2,3-bis-(2',2',6',6'-tetramethylpiperidyl-4'-amino)-quinazoline
8. 1,4-bis-(2',2',6',6'-tetramethylpiperidyl-4'-amino)-phthalazine
9. 2-chloro-4,6-bis-(2',2',6',6'-tetramethylpiperidyl-4'-ainino)-pyrimidine
10. 2,5-dichloro-4,6-bis-(2',2',6',6'-tetramethylpiperidyl-4'-amino)-pyrimidine
11. 2-fluoro-5-chloro-4,6-bis-(2',2',6',6'-tetramethylpiperidyl-4'-amino)pyrimidine
12. 2,4,6-tri-(2',2',6',6'-tetramethylpiperidyl-4'-amino)-pyrimidine
13. 2,4,6-tri-(2',2',6',6'-tetramethylpiperidyl-4'-amino-5-chloropyrimidine 14. 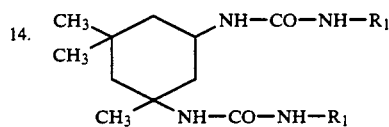

15. 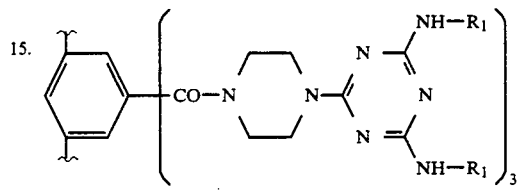

16. 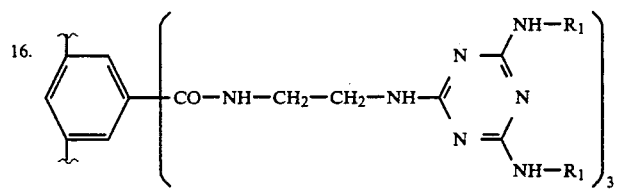

17. 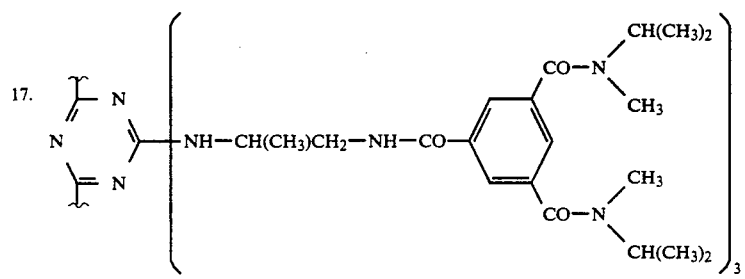

18. 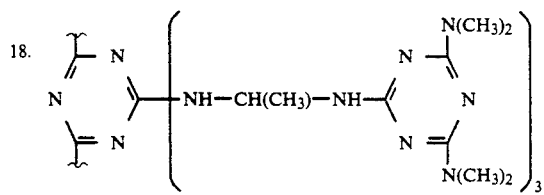
19. 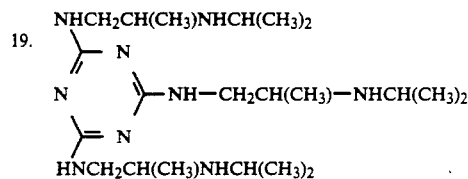
20. 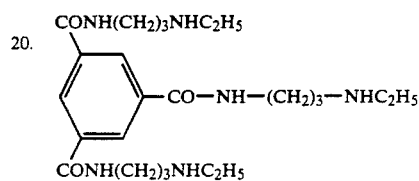
21. 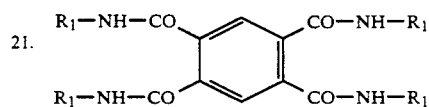
22. 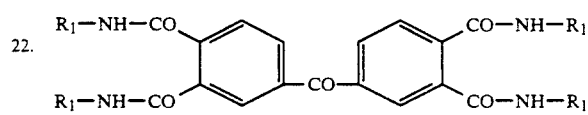
23. 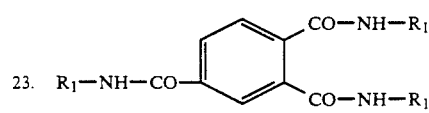
24. 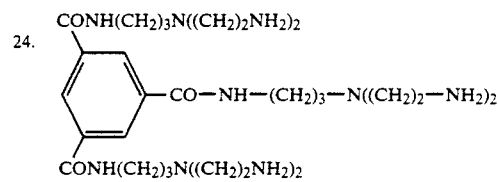
25. 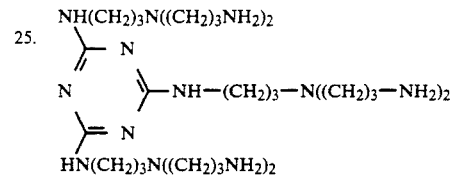
26. 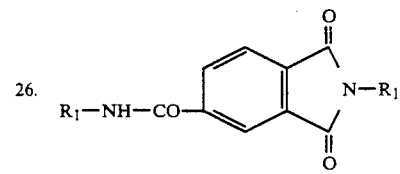
27. 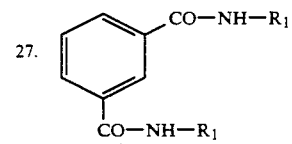

28. 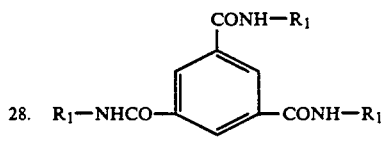
29. 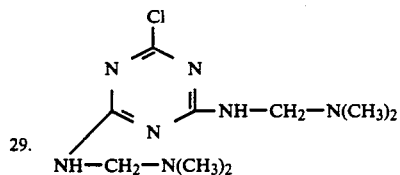
30. 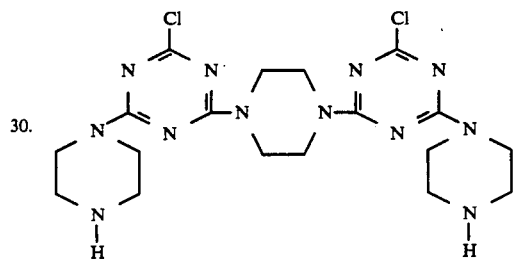
31. 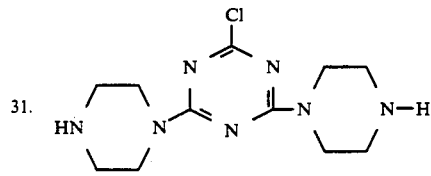
32. 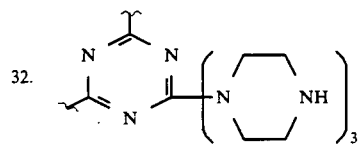
33. $(CH_3)_2C(CONH-R_1)_2$
34. $H_2N-(CH_2)_8-CONH-R_1$
wherein each $R_1$ in Formulae 14–34 is
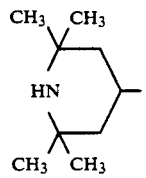
(2,2,6,6-tetramethylpiperidyl-4)
Preferred compounds A, given in the free acid form for salt formation with basic dyes, are, for example:
35. $H_2N-(CH_2)_8-COOH$
36. 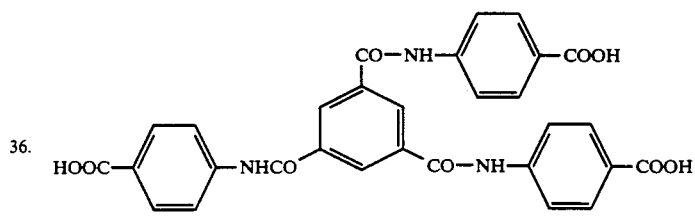
37. 4-(benzoylamino)benzoic acid -continued
38. 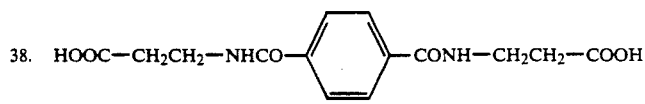 HOOC—CH₂CH₂—NHCO—⟨phenyl⟩—CONH—CH₂CH₂—COOH
39. 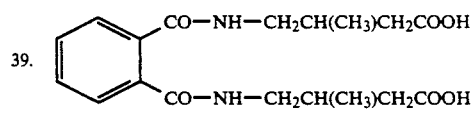
40. 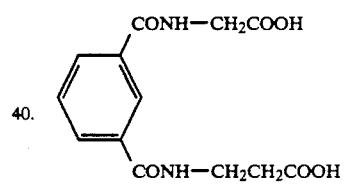
41. 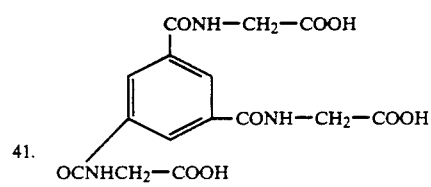
42. 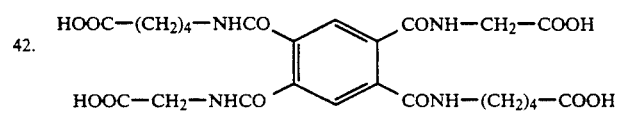
43. 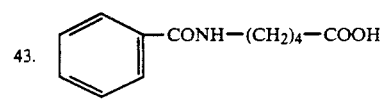
44. 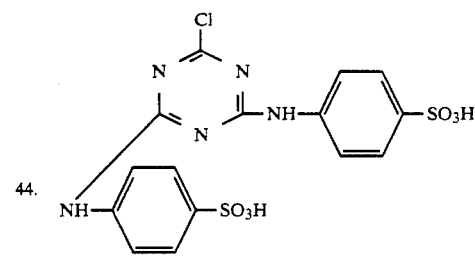
45. 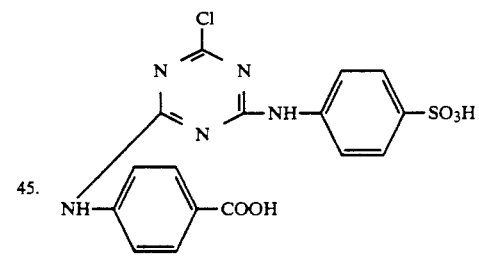
46. 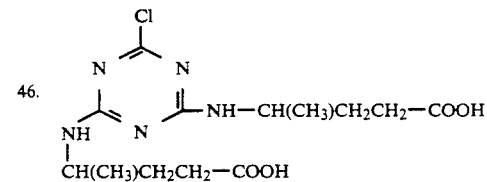
47. 2,4-bis-(4'-carboxyphenylamino)-6-chlorotriazine -continued

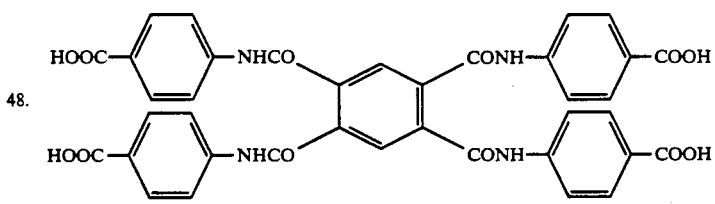

48.

49. 1,4-bis-(4'-carboxyphenylaminocarbonyl)benzene
50. 1,3-bis-(4'-carboxyphenylaminocarbonyl)benzene
51. 1,2-bis-(4'-carboxyphenylaminocarbonyl)benzene
52. 4-phenylbutanoic acid
53. 1,4-butanedioic acid
54. 1,2-ethanedioic acid Examples of anionic dyestuffs are:
C.I. Acid Blue 25, 40, 72, 106, 126, 129, 227, 230, 278, 280 and 296
C.I. Acid Yellow 59, 112, 114, 127 and 129
C.I. Acid Red 261 and 404
C.I. Acid Green 40
C.I. Acid Orange 82
C.I. Acid Violet 66
C.I. Acid Brown 28, 30 and 289
C.I. Acid Black 58 and 115
C.I. Solvent Yellow 83
C.I. Solvent Red 90:1, 91 and 92
C.I. Solvent Black 45.

Examples of cationic dyestuffs are:
C.I. Basic Yellow 13 and 49
C.I. Basic Orange 40
C.I. Basic Green 4
C.I. Basic Red 14, 22, 46 and 49
C.I. Basic Violet 16
C.I. Basic Blue 41, 54 and 78.

Production of the partly new components A, the amino or imino compounds, is effected in accordance with processes which are well known to those skilled in the art [amide formation from the acid chloride (e.g. trimesic acid trichloride, Example 1) and an amine (e.g. 2,2,6,6-tetramethyl-4-aminopiperidine), condensation of amines with triazinyl halide, etc.].

Production of the dyestuff salts of formula I similarly takes place in any way which is known to those skilled in the art. The acidic dyestuffs may be generally reacted, as they occur following production (e.g. as sodium salts), in the presence of adequate quantities of a mineral acid (e.g. HCl) with the basic components A, whilst forming a salt. The cationic dyestuffs are preferably reacted in a slightly alkaline medium with the components A containing the acidic groups. Mass-dyeing takes place in accordance with known methods.

By synthetic polyamides is understood all known artificial materials of this kind, especially the polycondensates or polymerisates of dicarboxylic acids and diamines, e.g. of adipic acid and hexamethylenediamine and of lactams, e.g. ω-aminoundecanoic acid. The polyamide melts which are mixed with the dyestuffs of formula I are shaped in the usual way, e.g. in melt spinning machines, injection moulding machines, extruding machines or sheet blowers.

Example 1

Preparation of component A (formula 1 of the above series of formulae)

42.0 g of trimesic acid are heated for 5 hours to 80° C. with 144.0 ml of thionyl chloride in the presence of a catalytic quantity (3 ml) of dimethylformamide, then the excess thionyl chloride is distilled off, and the trimesic acid trichloride thus formed is dissolved in 500 ml of dioxane. A total of 187.2 g of 2,2,6,6-tetramethyl-4-aminopiperidine is added in drops whilst stirring, whereby dioxane (2000 ml altogether) is constantly added so as to allow the reaction mixture, whose temperature should never exceed 30° C., to remain stirrable. The reaction mixture is subsequently boiled for 48 hours with reflux cooling, and the residue is filtered, washed with acetone, dissolved in ca. 1000 ml of water, precipitated again with soda solution (at pH 10 to 11), filtered, washed with water and vacuum dried (yield 89.2 g =72% of a white powder with a melting point of >320° C.).

Preparation of a dyestuff salt according to the invention:

A solution of 20.8 g of the red dyestuff of formula $a_1$

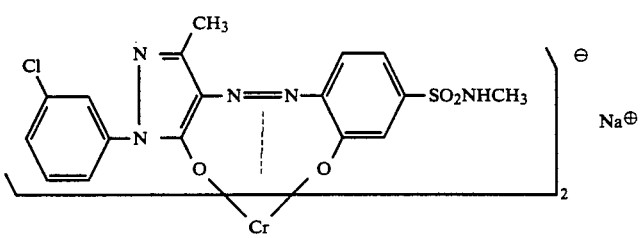

in 200 ml of water, 0.75 ml of HCl 3% and 0.4 g of salicylic acid is heated for 1 hour to 40° C., slowly mixed whilst stirring with a solution of 15.6 g of the triamide obtained as described above in 30 ml of water and 2.6 ml of HCl 30% and stirred for a further hour at 40° C., and the deposit is filtered off, washed with water and vacuum dried. 21 g of a dark red product of formula $a_2$

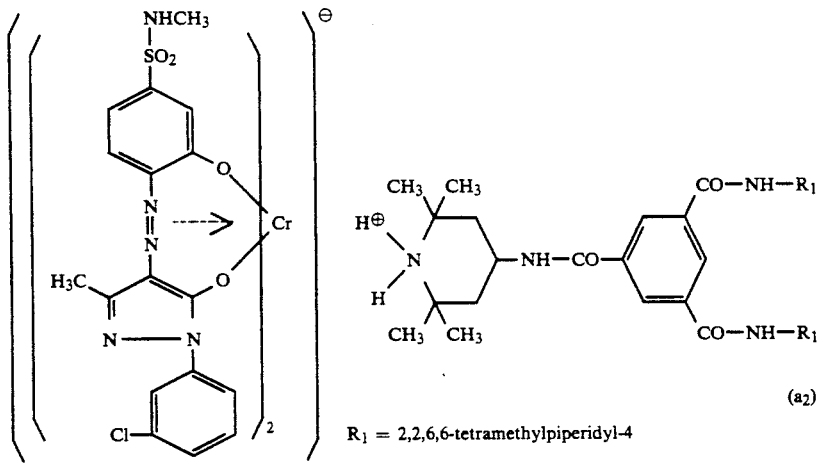

is obtained. Its melting point is above 320° C.

APPLICATION EXAMPLE 1

(All parts are parts by weight)

100 parts of poly-ε-caprolactam in powder form are mixed in a drum mixer with 1 part of the dyestuff according to the above example. The powder disperses very evenly within a short time. After ca. 10 minutes, the mixture is dried for 16 hours at 120° C., placed in a melt spinning machine, and after a dwelling time of 8 minutes at 275–280° C. under a nitrogen atmosphere, it is spun into fibres. The red-dyed fibres have exceptional light, washing and rubbing fastness.

Instead of the dyestuff of formula a₁, the dyestuffs
C.I. Acid Yellow 59 (Ex. 2)
C.I. Acid Violet 66 (Ex. 3)
C.I. Acid Red 404 (Ex. 4)
were also reacted as described above to form dyestuffs according to the invention (with salt formation), dyed on poly-ε-caprolactam and spun into fibres.

The dyestuff given in Example 1 was also reacted with the above-mentioned components A 2. to 34., by analogy with Example 1, to form salts and spun into fibres as indicated in the application example.

EXAMPLE 5

261.5 g of 2,4-bis-(carboxymethylamino)-6-chlorotriazine was distributed in 300 ml distilled water and added, whilst stirring, to a solution of 40 g NaOH in 300 ml distilled water. The mixture was stirred at room temperature for ca. 1 hour followed by the addition of 697.4 g of the pure dyestuff C.I. Basic Red 46. The mixture was stirred for a further hour at room temperature, and the red dyestuff which formed in the mixture was filtered off and dried. The solubility of this dyestuff in ethanol is greater than 250 g/liter.

APPLICATION EXAMPLE 2

(All parts are given as parts by weight and percentages as percentages by weight)

To 95 parts of a Nitrocellulose lacquer comprising:
18.8% Nitrocellulose A15 moistened with 35% isopropanol (in the form of white flakes)
6.3% acrylic acid butylester polymer, softening resin (Acronal 4F, BASF)
3.3% diphenyloctylphosphate, softener (Santicizer 141, Monsanto)
10.0% methoxypropanol (Dowanol PM, Dow Chemicals)
10.0% ethoxypropanol
41.6% ethanol
10.0% ethyl acetate
was added, with stirring, 5 parts of the dyestuff salt of Example 2, and this was left in a rolling frame overnight after which dissolution was complete.

Aluminum foil a) unlacquered and b) lacquered with colorless Nitrocellulose lacquer was coated with a 25 μm drawn wet-film of the lacquer-mixture and left to dry for 5 hours at 130° C. The consistency of the dyestuff salts assessed by the transparency of the dried film, and the adhesive strength on the unlacquered and the previously lacquered aluminum foil using the Scotch-tape-test were determined. Both properties were judged perfect.

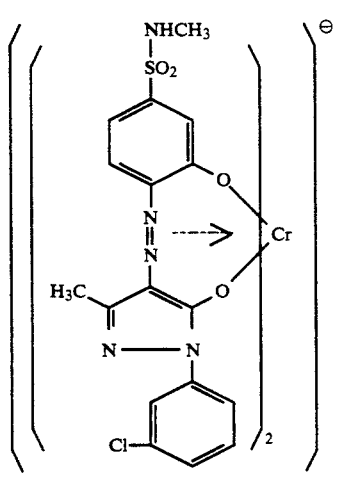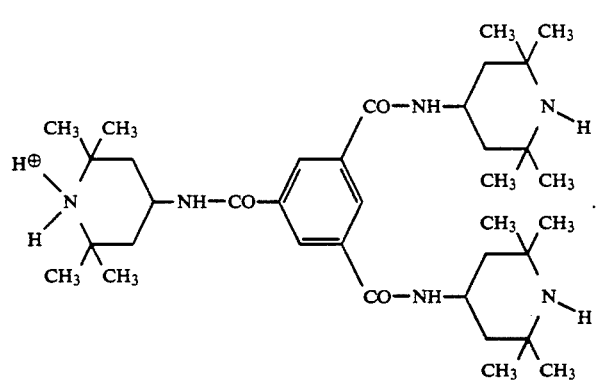

What is claimed is:

1. A dye salt of the formula $$F.(A)_n,$$

or a mixture of such salts, wherein
F is the anion of an anionic azo dye,
A is a cation containing one 2,2,6,6-tetramethyl-piperidinum-4 group, one, two or three 2,2,6,6-tetramethylpiperidyl-4 groups and at least one aliphatic, cycloaliphatic or carbonyl-subtituted aromatic group, and
n is 1, 2, 3 or 4.

2. A dye salt according to claim 1.

3. A dye salt according to claim 2 wherein n is 1 or 2.

4. A dye salt according to claim 3 wherein n is 1.

5. A dye salt according to claim 2 wherein F is the anion of an anionic metallized azo dye free of sulfo groups.

6. A dye salt according to claim 5 wherein n is 1 or 2.

7. A dye salt according to claim 6 wherein n is 1.

8. A dye salt of the formula $$F.(A)_n,$$

or a mixture of such salts, wherein
F is the anion of an anionic azo dye,
A is a cation derived from 2,4-bis-(2',2',6',6'-tetramethylpiperidyl-4'-amino)-6-chlorotriazine, 2,4,6-tri-(2',',2',6',6'-tetramethylpiperidyl-4'-amino)triazine, bis-(2',2',6',6'-tetramethylpiperidyl-4'-aminocarbonyl-para-phenylene)terephthalic acid diamide, bis-(2',2',6',6'-tetramethylpiperidyl-4'-)terephthalic acid diamide, 2,4-bis-(2',2',6',6'-tetramethylpiperidyl-4'-amino)quinazoline, 2,3-bis-(2',2',6',6'-tetramethylpiperidyl-4'-amino)quinazoline, 1,4-bis-(2,40 ,2',6',6'-tetramethylpiperidyl-4'-amino)phthalazine, 2-chloro-4,6-bis-2', 2', 6', 6'-tetramethylpiperidyl-4'-amino)pyrimidine, 2,5-dichloro-4,6-bis-(2',2',6',6'-tetramethylipiperidyl-4'-amino)-pyrimidine, 2-fluoro-5-chloro-4,6-bis-(2',2',6',6'-tetramethylpiperidyl-4'-amino)pyrimidine, 2,4,6-tri-(2',2',6',6'-tetramethylpoperidyl-4'-amino)pyrimidine, 2,4,6-tri-(2',2',6',6'-tetramethylpiperidyl-4'-amino)-5-chloropyrimidine,

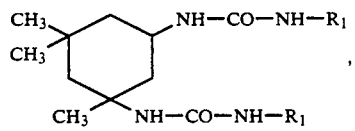

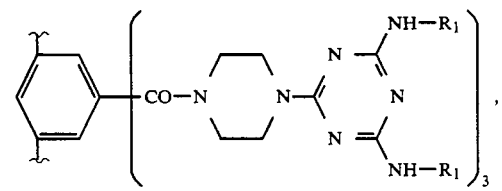

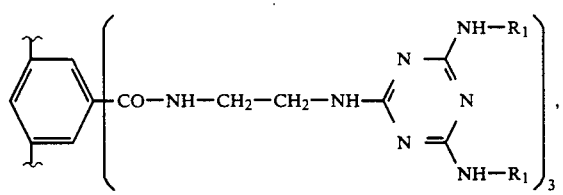

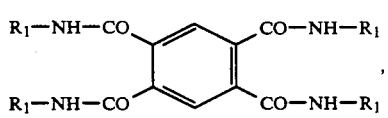

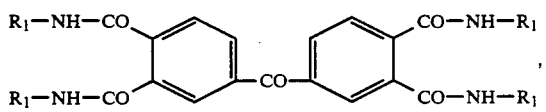

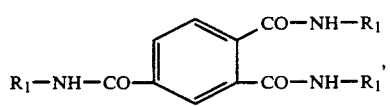

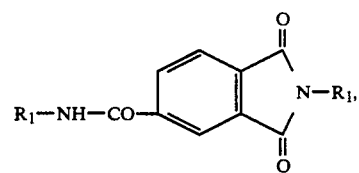

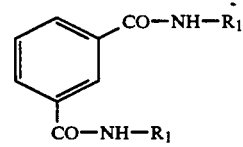

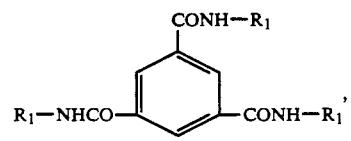

$(CH_3)_2C(CONH-R_1)_2$ or $H_2N-(CH_2)_8-CONH-R_1$, wherein
each $R_1$ is

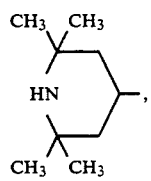

and n is 1, 2, 3 or 4.

9. A dye salt according to claim 8.

10. A dye salt according to claim 9 wherein n is 1 or 2.

11. A dye salt according to claim 10 wherein n is 1 or 2.

12. A dye salt according to claim 9 wherein F is the anion of an anionic metallized azo dye free of sulfo groups.

13. A dye salt according to claim 12 wherein n is 1 or 2.

14. A dye salt according to claim 13 wherein n is 1.

15. The dye salt according to claim 12 having the formula